(12) United States Patent
Voss et al.

(10) Patent No.: US 9,975,380 B1
(45) Date of Patent: *May 22, 2018

(54) PASSENGER REMINDER SYSTEMS AND METHODS

(71) Applicant: HONDA MOTOR CO., LTD., Tokyo (JP)

(72) Inventors: Thaddaeus Voss, Los Angeles, CA (US); Stuart Masakazu Yamamoto, La Miranda, CA (US)

(73) Assignee: Honda Motor Co., LTD., Tokyo (JP)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/704,522

(22) Filed: Sep. 14, 2017

Related U.S. Application Data (63) Continuation-in-part of application No. 15/695,543, filed on Sep. 5, 2017.

(51) Int. Cl.
*B60Q 1/00* (2006.01)
*B60C 9/00* (2006.01)
*B60R 1/00* (2006.01)

(52) U.S. Cl.
CPC . *B60C 9/00* (2013.01); *B60R 1/00* (2013.01)

(58) Field of Classification Search
None
See application file for complete search history.

(56) References Cited

U.S. PATENT DOCUMENTS

| 6,104,293 | A  | * | 8/2000  | Rossi    | B60N 2/002  |
|           |    |   |         |          | 340/425.5   |
| 9,022,080 | B2 | * | 5/2015  | Cun      | B60L 11/1838|
|           |    |   |         |          | 141/198     |
| 9,522,631 | B2 | * | 12/2016 | Kleinert | B60Q 9/00   |

(Continued)

FOREIGN PATENT DOCUMENTS

| JP | 2014223886 A    | 12/2014 |
| WO | WO 2013/035087 A1 | 3/2013  |
| WO | WO 2015/025435 A1 | 2/2015  |

OTHER PUBLICATIONS

White, Rebecca, "GM Expands Availability of Rear Seat Reminder Technology," http://media.gm.com/media/us/en/gm/home.detail.html/content/Pages/news/us/en/2016/dec/1206-rsr1.ht Dec. 6, 2016.

*Primary Examiner* — Julie Lieu
(74) *Attorney, Agent, or Firm* — Arent Fox LLP (57) ABSTRACT

A vehicle includes a body controller having a plurality of sensors that detect a state of a driver door and a rear passenger door and detect an ignition state of the vehicle. The vehicle includes a processor that activates an alert flag in response to receiving a first signal from the body controller indicating an ignition of the vehicle has been started and receiving a second signal from the body controller indicating the rear passenger door of the vehicle has been closed within an activation threshold time. The processor determines that the vehicle has made a temporary stop and maintains the activated alert flag upon detecting that the vehicle has been started in response to determining that the vehicle has made the temporary stop. The processor generates a notification in response to detecting that the vehicle has been parked a second time. The notification may include a camera feed.

20 Claims, 7 Drawing Sheets

(56) References Cited

U.S. PATENT DOCUMENTS

| | | | |
|---|---|---|---|
| 2006/0033634 A1* | 2/2006 | Best | B60N 2/002 340/666 |
| 2007/0268119 A1* | 11/2007 | Cram | B60Q 9/00 340/457 |
| 2014/0277826 A1* | 9/2014 | Fujii | B60R 21/01516 701/1 |
| 2015/0130604 A1* | 5/2015 | Gomez Collazo | B60N 2/002 340/457 |
| 2015/0286882 A1 | 10/2015 | Nicol | |
| 2016/0272112 A1 | 9/2016 | Degrazia et al. | |
| 2016/0307432 A1 | 10/2016 | Downs | |
| 2017/0104963 A1 | 4/2017 | Veneziano | |
| 2017/0161902 A1 | 6/2017 | Patil et al. | |

\* cited by examiner

PASSENGER REMINDER SYSTEMS AND METHODS

CLAIM OF PRIORITY UNDER 35 U.S.C. § 120

This application is a continuation in part of U.S. application Ser. No. 15/695,543, titled "PASSENGER REMINDER SYSTEMS AND METHODS," filed Sep. 5, 2017, which is assigned to the assignee hereof, and incorporated herein by reference in its entirety.

BACKGROUND

Modern automotive passenger vehicles may include a driver-side and passenger-side front seat oriented facing a normal forward direction of travel. A rear passenger area that includes at least one row of rear seats may be positioned aft of the front seats. The rear seats may be accessed via one or more separate rear doors. The rear seats of modern passenger vehicles may include lap and shoulder seat belts and buckles which together secure a passenger or object with respect to a surface of the rear seats. Passengers seated in a child restraint may be secured to one of the rear seats via the same seat belts and buckles, and/or via connection of the child restraint to a set of permanent LATCH ("Lower Anchors and Tethers for Children") anchors positioned with respect to the rear seat. The child restraint may be forward or rear facing.

There have been instances where a driver, or other responsible leaves a passenger in the rear passenger area when exiting the vehicle. In view of the foregoing, a passenger reminder system to provide a notification to a driver regarding rear passengers is provided. Further advantages will become apparent from the disclosure provided below.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

According to one aspect of the present disclosure, a method of monitoring a rear passenger area of a vehicle includes activating an alert flag in response to detecting that an ignition of the vehicle has been started and a rear passenger door of the vehicle has been closed within an activation threshold time. The method may include detecting that the vehicle has been parked a first time and that a driver door has been opened. The method may include determining that the vehicle has made a temporary stop. The method may include detecting that the ignition of the vehicle has been started. The method may include maintaining the activated alert flag upon detecting that the ignition of the vehicle has been started in response to determining that the vehicle has made a temporary stop. The method may include generating a notification in response to detecting that the vehicle has been parked a second time and the alert flag being activated.

In another aspect, a vehicle includes a body controller having a plurality of sensors detecting a state of at least a driver door and a rear passenger door and detecting a state of an ignition of the vehicle. The vehicle may include a processor that activates an alert flag in response to receiving a first signal from the body controller indicating the ignition of the vehicle has been started and receiving a second signal from the body controller indicating the rear passenger door of the vehicle has been closed within an activation threshold time. The processor may receive a third signal from the body controller indicating that the vehicle has been parked a first time. The processor may determine that the vehicle has made a temporary stop. The processor may receive a fourth signal from the body controller indicating the ignition of the vehicle has been started. The processor may maintain the activated alert flag upon receiving the fourth signal in response to determining that the vehicle has made a temporary stop. The processor may generate a notification in response to receiving a fifth signal from the body controller indicating that the vehicle has been parked a second time.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative aspects of the disclosure when read in conjunction with the accompanying drawings, wherein:

DETAILED DESCRIPTION

The following includes definitions of selected terms employed herein. The definitions include various examples and/or forms of components that fall within the scope of a term and that may be used for implementation. The examples are not intended to be limiting.

A "processor," as used herein, processes signals and performs general computing and arithmetic functions. Signals processed by the processor may include digital signals, data signals, computer instructions, processor instructions, messages, a bit, a bit stream, or other computing that may be received, transmitted and/or detected.

A "bus," as used herein, refers to an interconnected architecture that is operably connected to transfer data between computer components within a singular or multiple systems. The bus may be a memory bus, a memory controller, a peripheral bus, an external bus, a crossbar switch, and/or a local bus, among others. The bus may also be a vehicle bus that interconnects components inside a vehicle using protocols, such as Controller Area network (CAN), Local Interconnect Network (LIN), among others.

A "memory," as used herein may include volatile memory and/or non-volatile memory. Non-volatile memory may include, for example, ROM (read only memory), PROM (programmable read only memory), EPROM (erasable PROM) and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and/or direct RAM bus RAM (DRRAM).

An "operable connection," as used herein may include a connection by which entities are "operably connected", is one in which signals, physical communications, and/or logical communications may be sent and/or received. An operable connection may include a physical interface, a data interface and/or an electrical interface.

A "vehicle," as used herein, refers to any moving vehicle that is powered by any form of energy. A vehicle may carry human occupants or cargo. The term "vehicle" includes, but is not limited to: cars, trucks, vans, minivans, SUVs, motorcycles, scooters, boats, personal watercraft, and aircraft. In some cases, a motor vehicle includes one or more engines.

Some vehicles are equipped with a system to remind the driver to check the rear seating area before exiting the vehicle. Such reminder systems may deactivate under certain conditions. In particular, a reminder system may deactivate when a driver makes a temporary stop such as a stop for fueling the vehicle. The temporary stop may satisfy any conditions for completing a trip, so a notification may be generated and an alert flag may be set to a triggered state. The alert flag may be deactivated when the driver exits the vehicle. In such a scenario, a passenger in the rear seating area typically does not exit the vehicle. Upon the driver returning to the vehicle and restarting the vehicle, the reminder system may not be set because there has been no recent operation of the rear doors. Therefore, upon a subsequent stop, the reminder system may not trigger the alert flag or generate the notification to remind the driver of the passenger in the rear seating area.

Generally described, the systems and methods within the present disclosure provide for alerting a vehicle user of potential passengers located in rear seats of the vehicle, and in particular, where the vehicle makes a temporary stop during which one or more rear seat passengers may remain within the vehicle. The vehicle may detect the temporary nature of the stop and maintain or reset an alert flag such that the vehicle may notify the user of the potential rear seat passengers during a subsequent stop.

Figure 1:
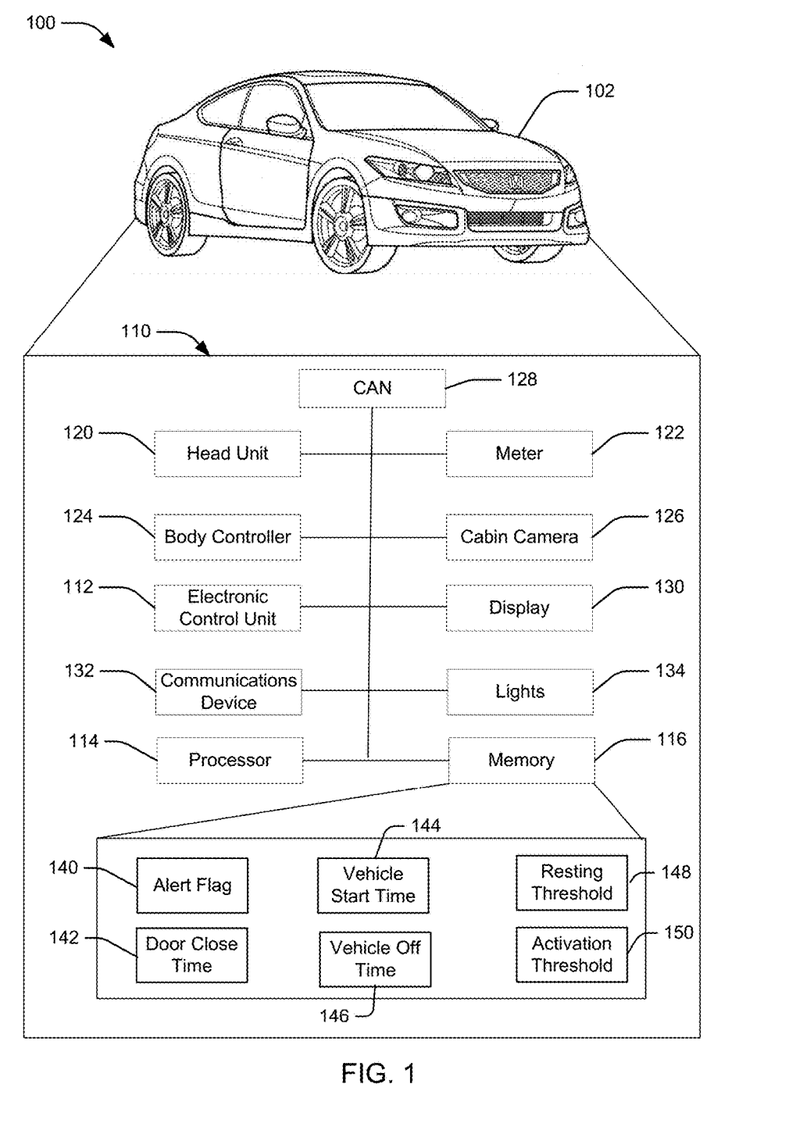
FIG. 1 illustrates a schematic view of an example operating environment of a rear passenger alert system in accordance with aspects of the present disclosure.

Turning to FIG. 1, a schematic view of an example operating environment 100 of a passenger alert system 110 and example methods according to an aspect of the disclosure is provided. The passenger alert system 110 may reside within a vehicle 102. The components of the passenger alert system 110, as well as the components of other systems, hardware architectures, and software architectures discussed herein, may be combined, omitted or organized into various implementations.

The vehicle 102 may generally include an electronic control unit (ECU) 112 that operably controls a plurality of vehicle systems. The vehicle systems may include, but are not limited to, the passenger alert system 110, among others, including vehicle body monitoring systems, vehicle HVAC systems, vehicle audio systems, vehicle video systems, vehicle infotainment systems, vehicle telephone systems, and the like. The passenger alert system 110 may include a cabin camera or other image-capturing device (e.g., a scanner) 120 that may also be connected to the ECU 112 to provide images of the environment within the vehicle 102, as described in further detail below. The passenger alert system 110 may also include a processor 114 and a memory 116 that communicate with the cabin camera 126, body controller 124, head unit 120, meter 122, display 130, and controller area network (CAN) 132.

The ECU 112 may include internal processing memory, an interface circuit, and bus lines for transferring data, sending commands, and communicating with the vehicle systems. The ECU 112 may include an internal processor and memory, not shown. The vehicle 102 may also include a bus for sending data internally among the various components of the passenger alert system 110.

The memory 116 may store instructions executable by the processor 114 for carrying out the methods described herein. Further, the memory 116 may store parameters for carrying out the methods described herein. For example, the memory 116 may store an alert flag 140, a door close time 142, a vehicle start time 144, a vehicle park time 146, a resting threshold time 148, and an activation threshold time 150. The alert flag 140 may indicate a current state of the passenger alert system 110. For example, the alert flag 140 may indicate one of a deactivated state, activated state, or triggered state. The door close time 142 may store a most recent time that a rear door was closed. The vehicle start time 144 may store a most recent time that the vehicle 102 was started. The vehicle park time 146 may store a most recent time that the vehicle 102 was parked. The resting threshold time 148 may store a parameter that configures a maximum duration that is considered a temporary stop. The activation threshold time 150 may store a parameter that configures a maximum duration used to determine whether a rear passenger has been loaded into the vehicle 102.

The vehicle 102 may include a cabin camera 126. The cabin camera 126 may be a digital camera capable of capturing one or more images or image streams, or may be another image capturing device, such as a scanner. For example, the cabin camera 126 may be located near the roof of the vehicle and capture an image of a rear passenger area of the vehicle 102. The cabin camera 126 may provide an image of each of the rear seats such that a driver viewing the image may determine whether a passenger (e.g., a child) is in each of the rear seats. In an aspect, the cabin camera 126 may refer to multiple cameras. For example, different cameras may be associated with individual seats or rows of seats.

The vehicle 102 may include a head unit 120. The head unit 120 may control a vehicle infotainment system and include a display 130. For example, the head unit 120 may be centrally mounted in a dashboard of the vehicle 102. The head unit 120 may control the display 130 to display images and menus associated with various features of the vehicle 102. In an aspect, when a passenger alert flag is triggered, the head unit 120 may display images generated by the cabin camera 126 on the display 130. The head unit 120 may also generate sounds or other notifications when the passenger alert flag is triggered.

The vehicle 102 may include a meter 122. The meter 122 may be an instrumentation portion of a vehicle dashboard. The meter 122 may include vehicle information and meters such as a speedometer, tachometer, fuel gauge, engine temperature gauge, oil gauge, or other information useful to the driver. The meter 122 may also include a notification display. For example, the notification display may provide messages regarding events detected by the vehicle such as traffic conditions, speed warnings, and vehicle component malfunctions. In an aspect, the meter 122 may use the notification display to provide a message for the passenger alert system 110. For example, the meter 122 may display a message such as "check rear passenger seats" when the alert flag is triggered.

The body controller 124 may include one or more sensors configured to detect a status of a vehicle component. For example the body controller 124 may include sensors that detect the opening and/or closing of each vehicle door. The body controller 124 may signal an event over the CAN 132 whenever a door opening or closing event occurs. In an aspect, the body controller 124 may include a fuel door sensor that detects whether a fuel door and/or gas cap has been opened. The body controller 124 may also detect an ignition state of the vehicle 102. The ignition state may indicate whether the vehicle 102 is on or off. For example, the ignition state may indicate "on" when a vehicle engine is running or an electric motor is switched on, and indicate "off" when a vehicle engine is stopped or an electric motor is switched off. The body controller 124 may also detect a selected gear of the vehicle 102. For example, the body controller 124 may detect that the vehicle 102 has been shifted into a park gear.

The vehicle 102 may include a communications device 132 (e.g., wireless modem) for providing wired or wireless computer communications utilizing various protocols to send/receive electronic signals internally with respect to features and systems within the vehicle 102 and with respect to external devices. These protocols may include a wireless system utilizing radio-frequency (RF) communications (e.g., IEEE 802.11 (Wi-Fi), IEEE 802.15.1 (Bluetooth®)), a near field communication system (NFC) (e.g., ISO 13157), a local area network (LAN), a wireless wide area network (WWAN) (e.g., cellular) and/or a point-to-point system. Additionally, the communications device 132 of the vehicle 102 may be operably connected for internal computer communication via a bus (e.g., a CAN or a LIN protocol bus) to facilitate data input and output between the electronic control unit 112 and vehicle features and systems. In an aspect, the communications device 132 may be configured for vehicle-to-vehicle (V2V) communications. For example, V2V communications may include wireless communications over a reserved frequency spectrum. As another example, V2V communications may include an ad hoc network between vehicles set up using Wi-Fi or Bluetooth®. The communications device may be configured for communication with a mobile device of a driver. The mobile device may have a telephone number, a device identifier (e.g., a mobile equipment identifier (MEID), an electronic serial number (ESN), or an international mobile equipment identify (IMEI)), an IP address, an email address, and/or a username associated with the vehicle 102 and used for communication between the communications device 132 and the mobile device. For example, the communications device 132 may provide a notification to the driver's mobile device.

The vehicle 102 may include lights 134, which may include any conventional lights used on vehicles such as head lights, tail lights, and cabin lights. The lights 134 may be controlled by the passenger alert system 110 and/or ECU 112 for providing various notifications. For example, the lights 134 may assist with providing an image of the rear seating area by illuminating the rear seating area while the image from cabin camera 126 is displayed. The lights 134 may also provide an additional or alternative notification, for example, by flashing or remaining on after a driver has exited the vehicle without opening a rear door.

Figure 2A:
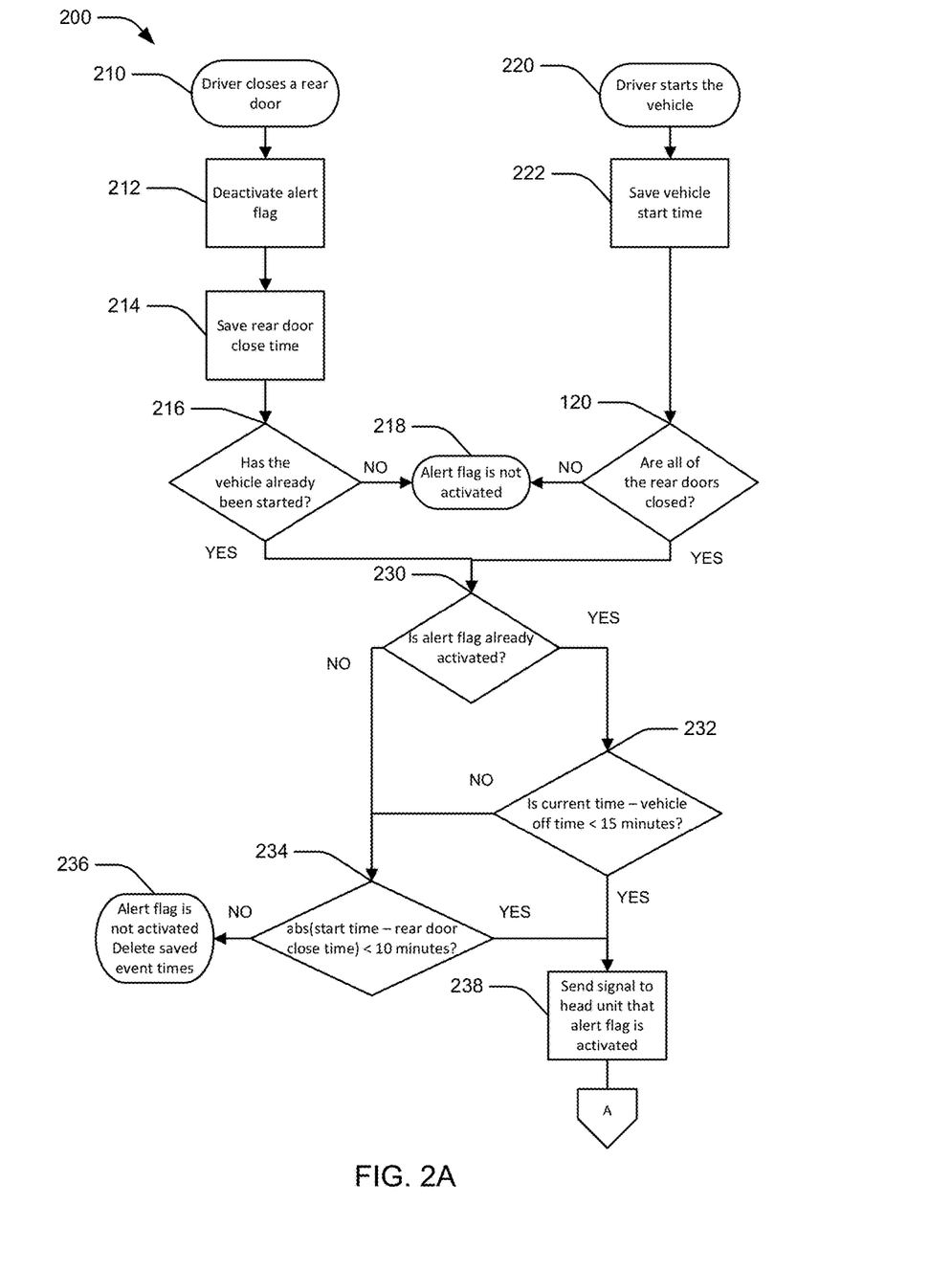
FIGS. 2A and 2B are a flowchart of an example method of providing a notification regarding a rear passenger.
Figure 2B:
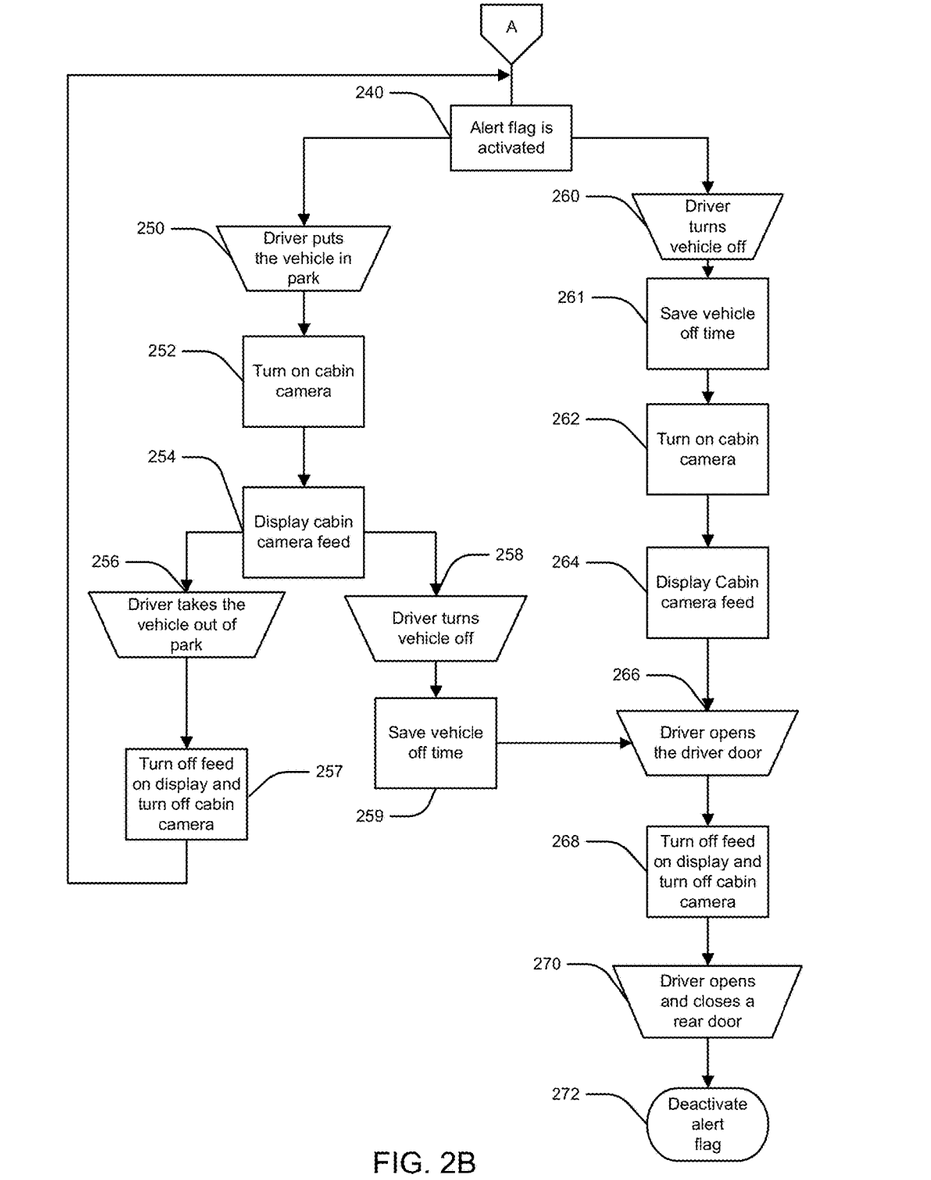

FIGS. 2A and 2B illustrate a flowchart of an example method 200 for providing a passenger reminder notification. The method 200 may be performed by a passenger alert system 110 within a vehicle. Generally, the passenger alert system 110 may inform a driver or other user that a passenger may be located in the rear seating area of the vehicle 102. In an aspect, the method 200 may be based on events detected by the body controller 124 and the status of the alert flag 140. The notification may include display of the rear seating area as captured by the cabin camera 126. In an aspect, the alert flag 140 may have a deactivated state, an active state, and a triggered state. When the alert flag 140 is in the deactivated state, the passenger alert system 110 may not trigger a notification. Accordingly, the use of alert flag 140 may avoid unnecessary alarms. When the alert flag 140 is in the active state, passenger alert system 110 may trigger a notification when a triggering condition occurs. For example, when the alert flag 140 is in the active state, the notification may be triggered when the vehicle is stopped and/or the driver door is opened. When the alert flag 140 is in the triggered state, the passenger alert system 110 may notify the driver to check for passengers in the rear seating area.

The method 200 may begin at either block 210 or block 220 depending on driver action. In block 210, the method 200 may begin when the driver closes a rear door. The body controller 124 may detect that the rear door has been closed and generate a signal on the CAN 128, which may be received by the ECU 112 and/or the processor 114. Similarly, in block 220, the method 200 may begin when the driver starts the vehicle. The body controller 124 may detect that the vehicle has been started and generate a signal on the CAN 128, which may be received by the ECU 112 and/or the processor 114. Starting the vehicle may include starting the engine in a fossil-fuel vehicle or turning on an electric vehicle. The method 200 may proceed from the respective starting block and continue until the method 200 is completed. It should be appreciated that the method 200 may be repeated multiple times for providing the passenger alert. Additionally or alternatively, the method 200 may operate as a loop and return to one of the initial blocks or a holding state until driver action occurs.

In block 212, in response to the driver closing a rear door at block 210, the method 200 may include deactivating an alert flag. In an aspect, for example, the ECU 112 and/or the processor 114 may switch the alert flag 140 to a deactivated state. Closing a rear door may indicate that the driver or other user has recently checked the rear seating area and does not need to be reminded of a potential rear passenger.

In block 214, the method 200 may include saving a rear door close time. For example, the ECU 112 and/or the processor 114 may save the rear door close time in memory 116.

In block 216, the method 200 may include determining whether the vehicle has already been started. For example, the ECU 112 and/or the processor 114 may determine whether the vehicle 102 has already been started based on a signal transmitted by the body controller 124 or a flag stored in memory 116 that indicates a previous body controller signal.

In block 222, in response to the driver starting the vehicle, the method 200 may include saving a vehicle start time. For example, the ECU 112 and/or the processor 114 may save the vehicle start time in memory 116.

In block 218, in response to determining that either the vehicle has not been started or that all of the rear doors are not closed, the method 200 may include determining not to activate the alert flag. For example, the ECU 112 and/or the processor 114 may determine not to activate the alert flag

140. The alert flag 140 may remain in a deactivated state. When the vehicle has not been started, there is generally no need to provide a notification regarding rear passengers because the vehicle does not move. For example, the driver may merely be placing or removing an object from the vehicle 102, but is unlikely to put a passenger into the vehicle 102 without starting the vehicle 102. Similarly, if all of the rear doors are closed, there may be no need to set the alert flag 140 until the open rear doors are closed. The method 200 may end at block 218 and wait for another block 210 or 220 to occur based on user action.

When the vehicle has been started and all of the rear doors are closed, the method 200 may proceed to block 230. In block 230, the method 200 may include determining whether the alert flag is already activated. If the alert flag 140 is already activated, the method 200 may proceed to block 232. If the alert flag 140 is not already activated, the method 200 may proceed to block 234.

In block 232, the method 200 may include determining whether a difference between the current time and a previous vehicle off time is less than a resting threshold time. The difference between the current time and the previous vehicle off time may be referred to as a resting time. In an aspect, the resting threshold time 148 is preferably 15 minutes, but may be another suitable value. The resting threshold time 148 may be used to determine whether a stop is a temporary stop. For example, in the case of a vehicle stopping for fuel, the driver is likely to turn the car off, refuel the vehicle 102, then restart the vehicle 102 within 15 minutes. Such a scenario may be considered a temporary stop and the trip may be treated as a continuous trip, which should maintain the activated state for the alert flag 140. That is, when the alert flag 140 is set to remind the driver of a rear seat passenger, the driver may make a temporary stop, but still be reminded of the rear seat passenger upon completion of the overall trip. Accordingly, if the resting time is less than the resting threshold time 148, the method 200 may proceed to block 238. If the resting time is greater than or equal to the resting threshold time 148, the method 200 may proceed to block 234.

In block 234, the method 300 may include determining whether a difference between a start time and a rear door close time is less than an activation threshold time. For example, the ECU 112 and/or the processor 114 may compare the vehicle start time 144 and the door close time 142 stored in memory 116 to the activation threshold time 150. In an aspect, the activation threshold time 150 is preferably 10 minutes, or another suitable time, which may represent an upper limit of expected loading time of the vehicle. If the difference between the vehicle start time 144 and the door close time 142 is less than the activation threshold time 150, and the alert flag 140 is not active, it may be likely that the driver has loaded a rear passenger and started the vehicle 102 in preparation for a trip. Accordingly, the alert flag 140 may be switched to the active state to remind the user to remove the rear passenger at the end of the trip. If the time between starting the vehicle and closing the rear door is greater than the activation threshold time 150, it may be less likely that a trip with a rear passenger is beginning, so no alert may be necessary. If the difference is less than the activation threshold time 150, the method 200 may proceed to block 238. If the difference is greater than or equal to the activation threshold time 150, the method 200 may proceed to block 236.

In block 236, the method 200 may include deactivating the alert flag. For example, the ECU 112 and/or the processor 114 may set the alert flag 140 to the deactivated state. Additionally, the block 236 may include deleting saved event times. For example, the ECU 112 and/or the processor 114 may delete saved vehicle start time 144, vehicle park time 146, and door close time 142 stored in memory 116.

In block 238, the method 200 may include sending a signal indicating that the alert flag is activated to a head unit. For example, the ECU 112 and/or the processor 114 may send the signal indicating that the alert flag 140 is activated to the head unit 120.

In block 240, the method 200 may include indicating that the alert flag is activated. For example, the head unit 120 may display a message or icon indicating that the alert flag 140 is activated. The method 200 may wait for an action of the driver, which may include the driver putting the vehicle into park in block 250 or the driver turning the vehicle off in block 260. Block 250 and block 260 may trigger the alert flag 140 and activate a notification to remind the driver to check the rear passenger area for a passenger.

In block 252, the method 200 may include turning on the cabin camera in response to the driver putting the vehicle in park. For example, the ECU 112 and/or the processor 114 may turn on the cabin camera 126 to begin acquiring images of the rear passenger area of the vehicle 102.

In block 254, the method 200 may include displaying a cabin camera feed. For example, the head unit 120 may display the cabin camera feed on the display 130. Accordingly, the driver may be presented with a view of the rear passenger seating area when the vehicle 102 is placed in park.

In block 256, the method 200 may include the driver taking the vehicle out of park. For example, the driver may place the vehicle in a drive gear without turning off the vehicle. The method 200 may return to block 240 with the alert flag 140 remaining activated. In block 258, the method 200 may include the driver turning the vehicle off while the vehicle is in park. The method 200 may proceed from block 258 to block 266.

In an alternative logical path, in block 260, the method 200 may include the driver turning the vehicle off. For example, depending on the configuration of the vehicle 102, the driver may turn off the vehicle 102 without placing the vehicle in park. For instance, an electric vehicle may be turned off without being in a park gear. In another aspect, turning the vehicle off while the vehicle is in a drive gear may automatically place the vehicle in park. In either case, the vehicle 102 may be considered parked and the body controller 124 may generate a signal indicating that the vehicle 102 has been parked.

In block 262, the method 200 may include turning on the cabin camera in response to the vehicle being turned off. For example, the ECU 112 and/or the processor 114 may turn on the cabin camera 126 to begin acquiring images of the rear passenger area of the vehicle 102.

In block 264, the method 200 may include displaying a cabin camera feed. For example, the head unit 120 may display the cabin camera feed on the display 130. Accordingly, the driver may be presented with a view of the rear passenger seating area when the vehicle 102 is turned off.

In block 266, the method 200 may include the driver opening the driver door. The body controller 124 may detect the driver opening the driver door and send a signal to the ECU 112 and/or the processor 114.

In block 268, the method 200 may include turning off the cabin camera feed on the display and turning off the cabin camera in response to the driver opening the driver door. For example, the ECU 112 and/or the processor 114 may send a command to the head unit 120 to turn off the cabin camera feed on the display 130. The ECU 112 and/or the processor 114 may also send a command to the cabin camera 126 to turn off.

In block 270, the method 200 may include the driver opening and closing a rear door. The body controller 124 may detect the driver opening and/or closing the driver door and send a signal to the ECU 112 and/or the processor 114.

In block 272, to the ECU 112 and/or the processor 114 may deactivate the alert in response to the signal from the body controller 124 indicating that the rear door was opened and/or closed.

Figure 3:
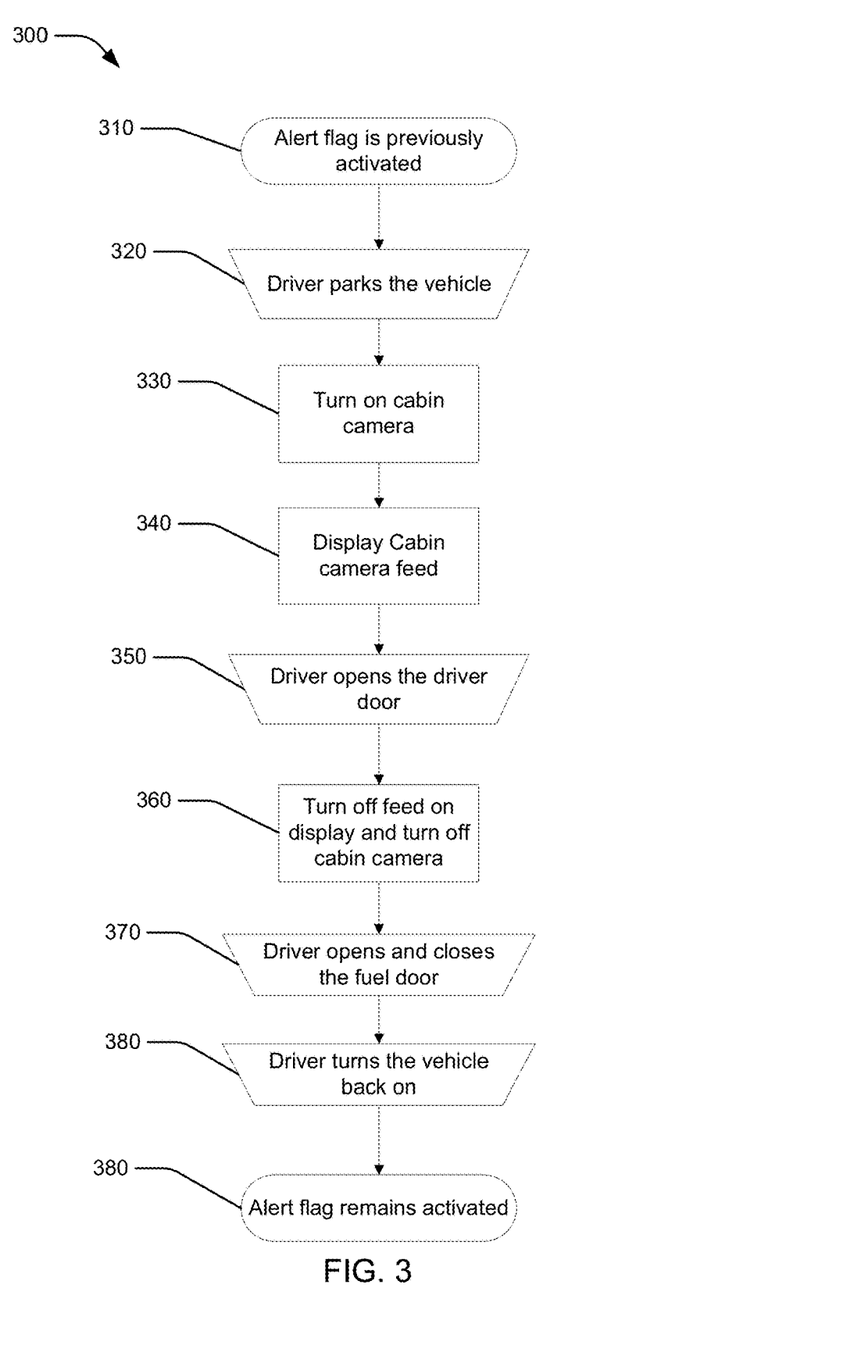
FIG. 3 is a flowchart of an example method of maintaining a rear passenger alert flag when the vehicle is refueled.

FIG. 3 illustrates a flowchart of an example method 300 for providing a passenger alert in a scenario where the driver refuels a vehicle. The method 300 may be performed by a passenger alert system 110 within a vehicle 102. Generally, the alert flag 140 may remain activated when the driver refuels the vehicle even if other conditions for triggering and disabling the alert flag 140 are satisfied. In an aspect, the method 200 may be based on events detected by the body controller 124.

In block 310, the method 300 may being with the alert being previously activated. For example, the block 310 may correspond to block 240 of the method 200.

In block 320, the method 300 may include the driver parking the vehicle. The driver may place the vehicle in a park gear. In another example, depending on the configuration of the vehicle 102, the driver may turn off the vehicle 102 without placing the vehicle in a park gear. For instance, an electric vehicle may be turned off without being in a park gear. In another aspect, turning the vehicle off while the vehicle is in a drive gear may automatically place the vehicle in the park gear. In either case, the vehicle 102 may be considered parked, and the body controller 124 may generate a signal indicating that the vehicle 102 has been parked.

In block 330, the method 300 may include turning on the cabin camera in response to the vehicle being turned off. For example, the ECU 112 and/or the processor 114 may turn on the cabin camera 126 to begin acquiring images of the rear passenger area of the vehicle 102.

In block 340, the method 300 may include displaying a cabin camera feed. For example, the head unit 120 may display the cabin camera feed on the display 130. Accordingly, the driver may be presented with a view of the rear passenger seating area when the vehicle 102 is turned off.

In block 350, the method 300 may include the driver opening the driver door. The body controller 124 may detect the driver opening the driver door and send a signal to the ECU 112 and/or the processor 114.

In block 360, the method 200 may include turning off the cabin camera feed on the display and turning off the cabin camera in response to the driver opening the driver door. For example, the ECU 112 and/or the processor 114 may send a command to the head unit 120 to turn off the cabin camera feed on the display 130. The ECU 112 and/or the processor 114 may also send a command to the cabin camera 126 to turn off.

In block 370, the method 300 may include the driver opening and/or closing the fuel door. The body controller 124 may detect the opening and/or closing of the fuel door and generate a signal to the ECU 112 and/or the processor 114.

In block 380, the method 300 may include the driver turning the vehicle back on. The body controller 124 may detect the vehicle being turned on and generate a signal to the ECU 112 and/or the processor 114.

In block 390, the method 300 may include the alert flag remaining active in response to the operation of the fuel door. The operation of the fuel door may indicate that turning the vehicle 102 off in block 320 was a temporary stop, in particular, for refueling the vehicle. Accordingly, a passenger in the rear seating area may remain in the vehicle during refueling. Therefore, even though the vehicle 102 was stopped and the driver exited the vehicle 102, the alert flag 140 may remain activated such that the notification may be triggered by a subsequent stop. Moreover, because the alert flag 140 is triggered in blocks 330 and 340, the notification of the camera feed may serve as a reminder to the driver during the refueling stop to check on the rear passenger. For example, the driver may be reminded to remove the passenger from the vehicle if a longer fuel stop is expected or the temperature is extreme.

Figure 4:
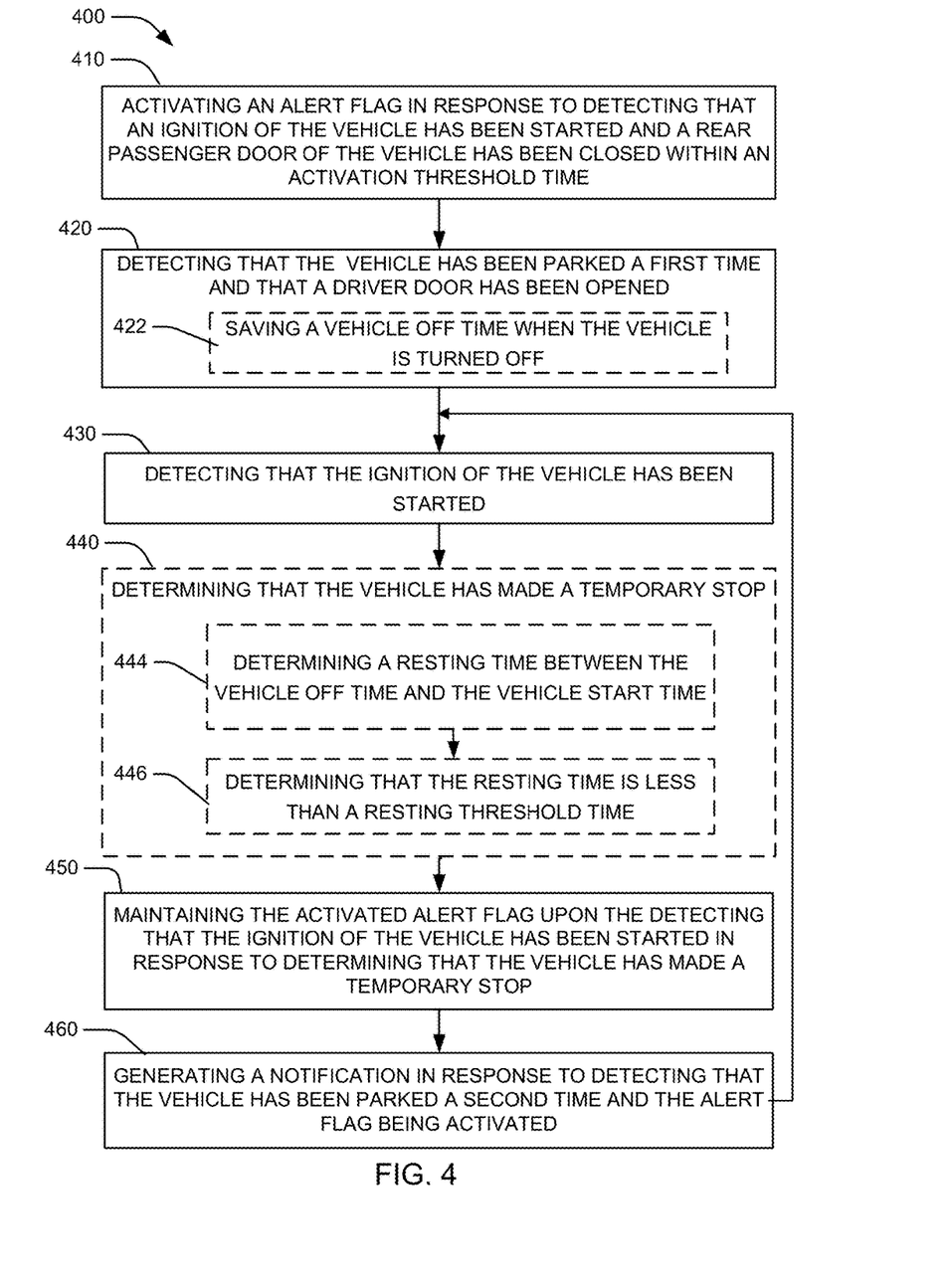
FIG. 4 is a flowchart of an example method of providing a rear passenger notification when a vehicle makes a temporary stop.

FIG. 4 illustrates a flowchart of an example method 400 for providing a passenger notification. The method 400 may be performed by a passenger alert system 110 within a vehicle 102.

In block 410, the method 400 may include activating an alert flag in response to detecting that the vehicle has been started and that a rear passenger door has been closed within a first threshold time. In an aspect, for example, the ECU 114 and/or the processor 116 may activate an alert in response to detecting that the vehicle 102 has been started and that a rear passenger door has been closed within a first threshold time.

In block 420, the method 400 may include detecting that the vehicle has been parked a first time and that a driver door has been opened. In an aspect, for example, the body controller 124 may that the vehicle has been parked a first time and that a driver door has been opened. For example, the body controller may detect that the vehicle has been parked when the vehicle 102 is shifted into a park gear or a vehicle ignition is switched off. The body controller 124 may generate signals that are transmitted on the CAN 128 indicating to the ECU 112 and/or the processor 114 that the vehicle has been parked and the driver door has been opened.

In block 430, the method 400 may include detecting that the ignition of the vehicle has been started. In an aspect, for example, the body controller 124 may detect that the ignition of the vehicle has been started. The body controller may transmit a signal on the CAN 128 indicating that the ignition of the vehicle has been started. The ECU 112 and/or the processor 114 may save the vehicle start time 144 in the memory 116.

In block 440, the method 400 may include determining that the vehicle has made a temporary stop. In an aspect, for example, the ECU 112 and/or the processor 114 may determine that the vehicle has made a temporary stop based on signals received on the CAN 128 from the body controller 124. For example, block 430 may include detecting operation of a fuel door. Operation of the fuel door may include opening and/or closing of the fuel door. The body controller 124 may transmit a signal on the CAN 128 indicating that the fuel door was opened and/or closed. Similar, the body controller 124 may generate a signal based on the a fuel cap to indicate operation of the fuel door. The ECU 112 and/or processor 114 may determine that the vehicle has made a temporary stop for fuel in response to detecting operation of the fuel door. As another example, in block 444, determining that the vehicle has made a temporary stop may include determining a resting time between the stopping of the vehicle a first time and the starting of the vehicle. For example, the ECU 112 and/or the processor 114 may determine the resting time based on signals received from the body controller 124 and parameters stored in memory 116. For instance, the ECU 112 and/or the processor 114 may determine the resting time as the difference between the vehicle start time 144 and the vehicle stop time 146 In block 446, determining that the vehicle has made a temporary stop may include determining that the resting time is less than a second threshold time. For example, the ECU 112 and/or the processor 114 may determine that the resting time is less than the resting threshold. The ECU 112 and/or the processor 114 may determine that the vehicle has made a temporary stop when the resting time is less than the resting threshold.

In block 450, the method 400 may include maintaining the activated alert upon the detecting that the ignition of the vehicle has been started in response to determining that the vehicle has made a temporary stop. In an aspect, for example, ECU 112 and/or the processor 114 may maintain the activated alert upon the detecting that the ignition of the vehicle has been started in response to determining that the vehicle has made a temporary stop. For example, the ECU 112 and/or the processor 114 may maintain or set a value of the alert flag 140 in the memory 116. In an aspect, maintaining the activated alert may override another condition that may disable the alert when the vehicle has not made a temporary stop. For example, the passenger alert system 110 may be configured to trigger only once for each activation, but may be triggered a second time when the activated alert is maintained after a temporary stop. As another example, the alert may be maintained regardless of whether a rear door is opened or closed during a temporary stop.

In block 460, the method 400 may include generating a notification in response to detecting that the vehicle has been parked a second time. In an aspect, for example, the ECU 112 and/or the processor 114 may control the head unit 120 and/or the meter 122 to generate a notification in response to detecting that the vehicle has been parked the second time. For example, the notification may include an image generated by the cabin camera 126. The head unit 120 may display a feed from the cabin camera 126 on the display 130. The notification may also include displaying a message. The meter 122 may display the message, which may be displayed concurrently with the feed from the cabin camera 126. Other forms of notification may include: sounding a notification chime; sounding a voice reminder; transmitting a notification to a mobile device associated with the driver; flashing vehicle lights; or providing haptic feedback. For example, the head unit 120 may control speakers to sound a notification chime or to sound a voice reminder. The communications device 132 may transmit a notification to the mobile device associated with the driver. The ECU 112 may control the lights 134 to flash. The ECU 112 may control a steering wheel, or vibration device mounted thereon, to provide haptic feedback. Following block 460, the method 400 may return to block 430 to determine whether the vehicle has made a temporary stop. That is, parking the vehicle a second time may be a temporary stop. The passenger alert system 110 may maintain the activated alert flag following each additional temporary stop. Accordingly, a notification may be generated for each stop in a series of temporary stops.

Figure 5:
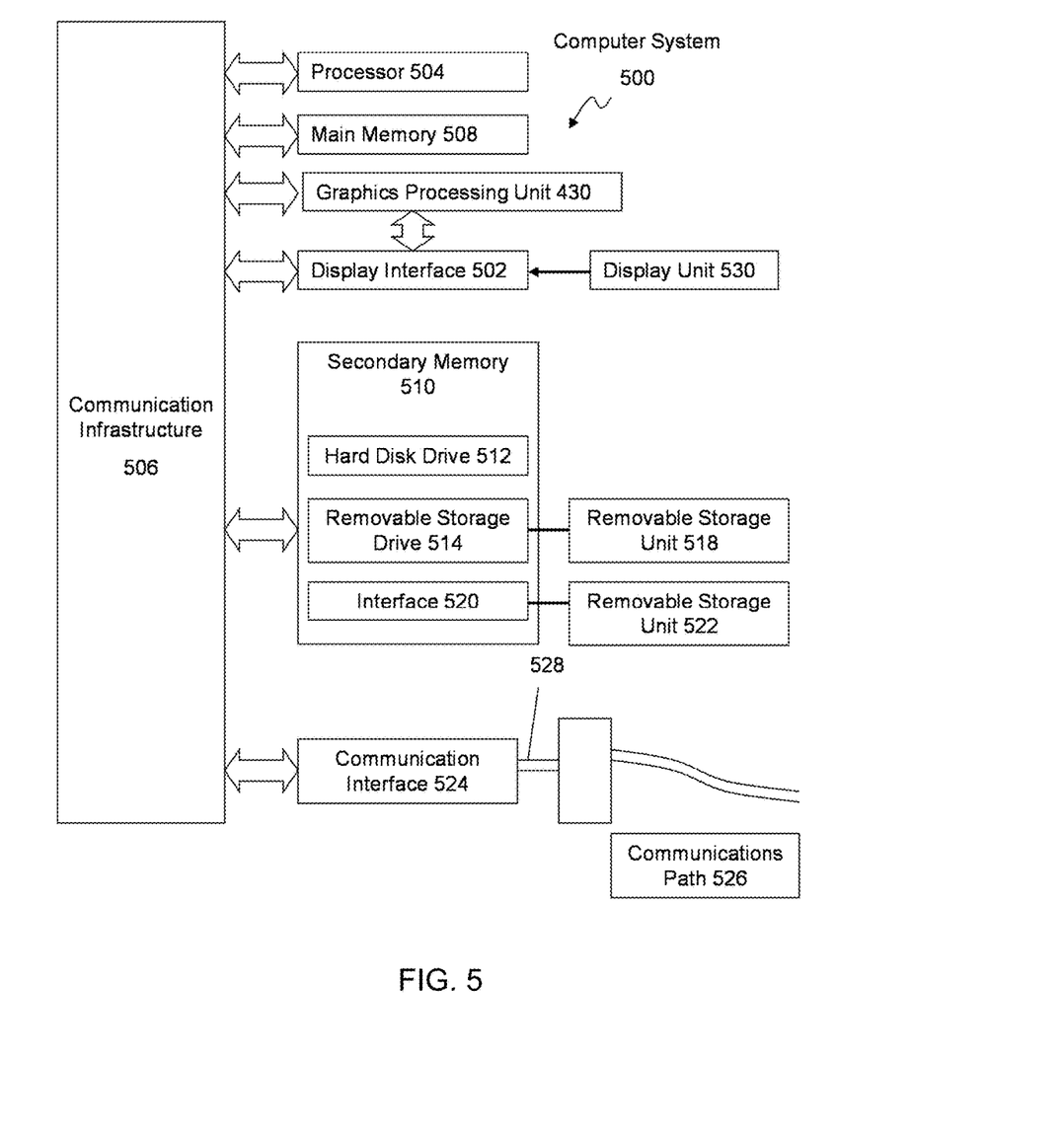
FIG. 5 presents an exemplary system diagram of various hardware components and other features for use in accordance with aspects of the present disclosure.

Aspects of the present disclosure may be implemented using hardware, software, or a combination thereof and may be implemented in one or more computer systems or other processing systems. In one aspect, the disclosure is directed toward one or more computer systems capable of carrying out the functionality described herein. FIG. 5 presents an example system diagram of various hardware components and other features that may be used in accordance with aspects of the present disclosure. Aspects of the present disclosure may be implemented using hardware, software, or a combination thereof and may be implemented in one or more computer systems or other processing systems. In one exemplary variation, aspects of the disclosure are directed toward one or more computer systems capable of carrying out the functionality described herein. An example of such a computer system 500 is shown in FIG. 5.

Computer system 500 includes one or more processors, such as processor 504. The processor 504 is connected to a communication infrastructure 506 (e.g., a communications bus, cross-over bar, or network). Various software aspects are described in terms of this example computer system. After reading this description, it will become apparent to a person skilled in the relevant art(s) how to implement aspects of the disclosure using other computer systems and/or architectures.

Computer system 500 may include a display interface 502 that forwards graphics, text, and other data from the communication infrastructure 506 (or from a frame buffer not shown) for display on a display unit 530. Computer system 500 also includes a main memory 508, preferably random access memory (RAM), and may also include a secondary memory 510. The secondary memory 510 may include, for example, a hard disk drive 512 and/or a removable storage drive 514, representing a floppy disk drive, a magnetic tape drive, an optical disk drive, etc. The removable storage drive 514 reads from and/or writes to a removable storage unit 518 in a well-known manner. Removable storage unit 518, represents a floppy disk, magnetic tape, optical disk, etc., which is read by and written to removable storage drive 514. As will be appreciated, the removable storage unit 518 includes a computer usable storage medium having stored therein computer software and/or data.

In alternative aspects, secondary memory 510 may include other similar devices for allowing computer programs or other instructions to be loaded into computer system 500. Such devices may include, for example, a removable storage unit 522 and an interface 520. Examples of such may include a program cartridge and cartridge interface (such as that found in video game devices), a removable memory chip (such as an erasable programmable read only memory (EPROM), or programmable read only memory (PROM)) and associated socket, and other removable storage units 522 and interfaces 520, which allow software and data to be transferred from the removable storage unit 522 to computer system 500.

Computer system 500 may also include a communications interface 524. Communications interface 524 allows software and data to be transferred between computer system 500 and external devices. Examples of communications interface 524 may include a modem, a network interface (such as an Ethernet card), a communications port, a Personal Computer Memory Card International Association (PCMCIA) slot and card, etc. Software and data transferred via communications interface 524 are in the form of signals 528, which may be electronic, electromagnetic, optical or other signals capable of being received by communications interface 524. These signals 528 are provided to communications interface 524 via a communications path (e.g., channel) 526. This path 526 carries signals 528 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 580, a hard disk installed in hard disk drive 570, and signals 528. These computer program products provide software to the computer system 500. Aspects of the disclosure are directed to such computer program products.

Computer programs (also referred to as computer control logic) are stored in main memory 508 and/or secondary memory 510. Computer programs may also be received via communications interface 524. Such computer programs, when executed, enable the computer system 500 to perform various features in accordance with aspects of the present disclosure, as discussed herein. In particular, the computer programs, when executed, enable the processor 504 to perform such features. Accordingly, such computer programs represent controllers of the computer system 500.

In variations where aspects of the disclosure are implemented using software, the software may be stored in a computer program product and loaded into computer system 500 using removable storage drive 514, hard disk drive 512, or communications interface 520. The control logic (software), when executed by the processor 504, causes the processor 504 to perform the functions in accordance with aspects of the disclosure as described herein. In another variation, aspects are implemented primarily in hardware using, for example, hardware components, such as application specific integrated circuits (ASICs). Implementation of the hardware state machine so as to perform the functions described herein will be apparent to persons skilled in the relevant art(s).

In yet another example variation, aspects of the disclosure are implemented using a combination of both hardware and software.

Figure 6:
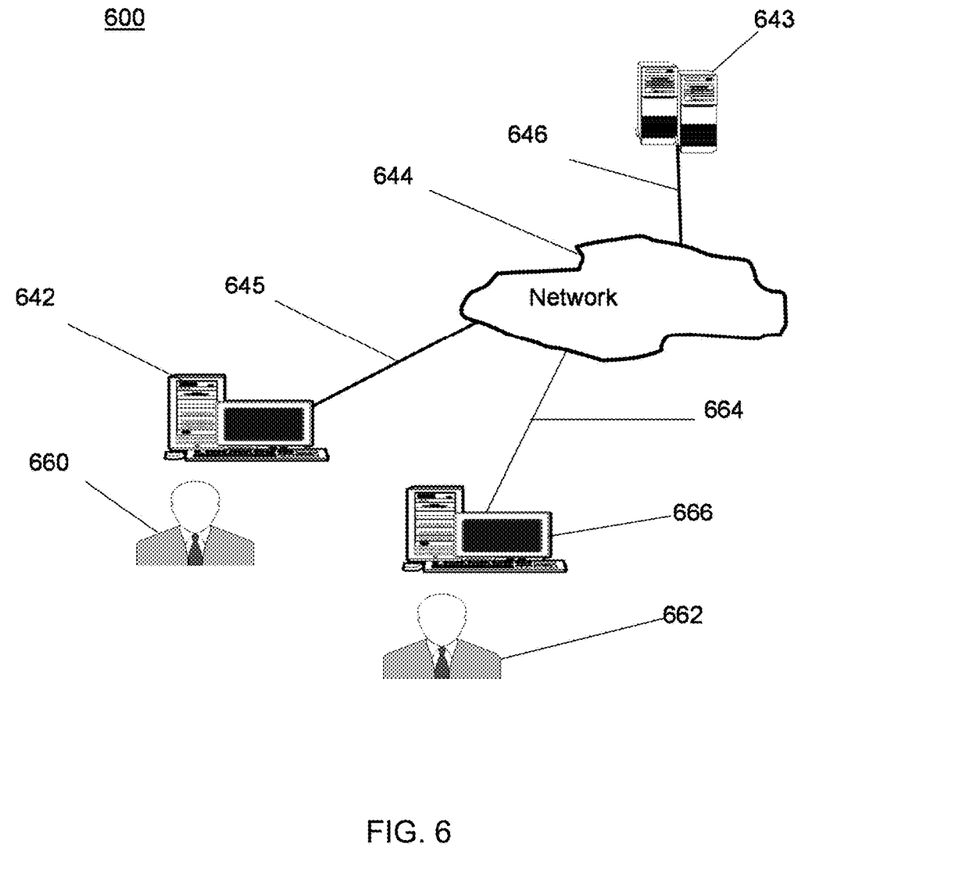
FIG. 6 is a block diagram of various exemplary system components for use in accordance with aspects of the present disclosure.

FIG. 6 is a block diagram of various example system components that may be used in accordance with aspects of the present disclosure. For example, the various components may be within the vehicle 102, or only some of the components may be within the vehicle 102, and other components may be remote from the vehicle 102. The system 600 includes one or more accessors 660, 662 (also referred to interchangeably herein as one or more "users") and one or more terminals 642, 666 (such terminals may be or include, for example, various features of the passenger alert system 110). In one aspect, data for use in accordance with aspects of the present disclosure is, for example, input and/or accessed by accessors 660, 662 via terminals 642, 666, such as personal computers (PCs), minicomputers, mainframe computers, microcomputers, telephonic devices, or wireless devices, such as personal digital assistants ("PDAs") or a hand-held wireless devices coupled to a server 643, such as a PC, minicomputer, mainframe computer, microcomputer, or other device having a processor and a repository for data and/or connection to a repository for data, via, for example, a network 644, such as the Internet or an intranet, and couplings 645, 646, 664. The couplings 645, 646, 664 include, for example, wired, wireless, or fiber optic links. In another example variation, the method and system in accordance with aspects of the present disclosure operate in a stand-alone environment, such as on a single terminal.

The aspects of the disclosure discussed herein may also be described and implemented in the context of computer-readable storage medium storing computer-executable instructions. Computer-readable storage media includes computer storage media and communication media. For example, flash memory drives, digital versatile discs (DVDs), compact discs (CDs), floppy disks, and tape cassettes. Computer-readable storage media may include volatile and nonvolatile, removable and non-removable media implemented in any method or technology for storage of information such as computer readable instructions, data structures, modules or other data.

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A method of monitoring a rear passenger area of a vehicle comprising:
   activating an alert flag in response to detecting that an ignition of the vehicle has been started and a rear passenger door of the vehicle has been closed within an activation threshold time;
   detecting that the vehicle has been parked a first time and that a driver door has been opened;
   saving a vehicle off time when the vehicle is turned off;
   saving a vehicle start time when the ignition of the vehicle has been started;
   determining a resting time between the vehicle off time and vehicle start time;
   determining that the vehicle has made the temporary stop when the resting time is less than a resting threshold time;
   maintaining the activated alert flag upon detecting that the ignition of the vehicle has been started in response to determining that the vehicle has made the temporary stop; and
   generating a notification in response to detecting that the vehicle has been parked a second time and the alert flag being activated.

2. The method of claim 1, wherein determining that the vehicle has made the temporary stop comprises detecting opening of a fuel door on the vehicle.

3. The method of claim 1, wherein the resting threshold time is greater than or equal to the activation threshold time.

4. The method of claim 1, wherein the resting threshold time is between 10 minutes and 20 minutes.

5. The method of claim 1, comprising sending a signal to a meter indicating that the alert flag is active.

6. The method of claim 1, wherein generating the notification comprises displaying a camera image and displaying a message.

7. The method of claim 1, further comprising turning off the display of the camera image in response to the vehicle being taken out of park.

8. The method of claim 1, wherein generating the notification comprises one or more of: sounding a notification chime; sounding a voice reminder; transmitting the notification to a mobile device associated with a driver; flashing vehicle lights; or providing haptic feedback.

9. The method of claim 1, wherein the vehicle being parked comprises at least one of the vehicle being in a park gear or the ignition of the vehicle being off.

10. The method of claim 1, comprising:
    detecting that a rear door remains open when the vehicle is placed in a drive gear;
    generating an alarm in response to the rear door remaining open; and
    detecting that the rear door has been closed, wherein activating the alert flag is in response to detecting that the rear door has been closed following the alarm.

11. The method of claim 1, comprising generating a notification in response to detecting that the vehicle has been parked the first time.

12. A vehicle comprising:
- a body controller including a plurality of sensors detecting a state of at least a driver door and a rear passenger door and detecting a state of an ignition of the vehicle; and
- a processor that:
  - activates an alert flag in response to receiving a first signal from the body controller indicating the ignition of the vehicle has been started and receiving a second signal from the body controller indicating the rear passenger door the vehicle has been closed within an activation threshold time;
  - receives a third signal from the body controller indicating that the vehicle has been parked a first time;
  - saves a vehicle off time when the vehicle is turned off;
  - receives a fourth signal from the body controller indicating the ignition of the vehicle has been started;
  - saves a vehicle start time when the ignition of the vehicle has been started;
  - determines a resting time between the vehicle off time and vehicle start time;
  - determines that the vehicle has made a temporary stop when the resting time is less than a resting threshold time;
  - maintains the activated alert flag upon receiving the fourth signal in response to determining that the vehicle has made the temporary stop; and
  - generates a notification in response to receiving a fifth signal from the body controller indicating that the vehicle has been parked a second time.

13. The vehicle of claim 12, wherein the processor determines that the vehicle has made the temporary stop in response to a signal from the body controller indicating that a fuel door has been opened.

14. The vehicle of claim 12, wherein the resting threshold time is greater than or equal to the activation threshold time.

15. The vehicle of claim 12, wherein the resting threshold time is between 10 minutes and 20 minutes.

16. The vehicle of claim 12, further comprising a meter, wherein the processor sends a signal to the meter indicating that the alert flag is active.

17. The vehicle of claim 12, comprising:
- a cabin camera configured to capture an image feed of a rear passenger area; and
- a display, wherein the processor presents the image feed of the rear passenger area on the display to generate the notification.

18. The vehicle of claim 12, wherein the processor turns off the display of the camera image in response to the vehicle being taken out of park.

19. The vehicle of claim 12, wherein the processor generates the notification by one or more of: sounding a notification chime; sounding a voice reminder; transmitting a notification to a mobile device associated with a driver; flashing vehicle lights; or providing haptic feedback.

20. The vehicle of claim 12, wherein the processor generates a notification in response to the third signal.

* * * * *

UNITED STATES PATENT AND TRADEMARK OFFICE
CERTIFICATE OF CORRECTION

| | | |
|---|---|---|
| PATENT NO. | : 9,975,380 B1 | Page 1 of 1 |
| APPLICATION NO. | : 15/704522 | |
| DATED | : May 22, 2018 | |
| INVENTOR(S) | : Thaddaeus Voss et al. | |

It is certified that error appears in the above-identified patent and that said Letters Patent is hereby corrected as shown below:

On the Title Page

(72) Second Named Inventor City reads:
Stuart Masakazu Yamamoto, La Miranda, CA (US)

Should read:
Stuart Masakazu Yamamoto, La Mirada, CA (US)

Signed and Sealed this
Twenty-eighth Day of August, 2018

Andrei Iancu
*Director of the United States Patent and Trademark Office*